United States Patent [19]

Bennett

[11] Patent Number: 5,720,687

[45] Date of Patent: Feb. 24, 1998

[54] CONTINUOUSLY VARIABLE TRANSMISSION

[75] Inventor: John Sebastian Bennett, Leamington Spa, United Kingdom

[73] Assignee: Massey Ferguson Manufacturing Limited, England

[21] Appl. No.: 649,670

[22] PCT Filed: Nov. 16, 1994

[86] PCT No.: PCT/GB94/02519

§ 371 Date: May 15, 1996

§ 102(e) Date: May 15, 1996

[87] PCT Pub. No.: WO95/14183

PCT Pub. Date: May 26, 1995

[30] Foreign Application Priority Data

Nov. 17, 1993 [GB] United Kingdom ............... 9323706

[51] Int. Cl.⁶ ............................................ F16H 37/08
[52] U.S. Cl. ............................................ 475/214; 475/216
[58] Field of Search .................. 74/15.63; 475/214, 475/215, 216

[56] References Cited

U.S. PATENT DOCUMENTS 4,402,237 9/1983 Tomlinson ........................ 475/210
5,147,254 9/1992 Baier et al. ....................... 74/15.63 X
5,337,848 8/1994 Bader ................................ 477/4 X
5,403,241 4/1995 Jarchow et al. .................... 475/72

FOREIGN PATENT DOCUMENTS 0044202  1/1982  European Pat. Off. .
 959763  6/1964  United Kingdom .
2108599  5/1983  United Kingdom .
2115091  9/1983  United Kingdom .
2267323 12/1993  United Kingdom .

*Primary Examiner*—Khoi Q. Ta
*Attorney, Agent, or Firm*—MacMillan, Sobanski & Todd

[57] ABSTRACT

A CVT having a variator unit, epicyclic unit for plural ratio combinations, plural regime engagin couplers, a clutch and an output shaft. The epicyclic unit includes a splitting epicyclic gear and two components of the splitter is connected to the oppsite ends of the variator. The epicyclic unit having plural connections to the drive output shaft through the regime engaging couplers. The epicyclic unit also includes a recirculating epicyclic which has two components commoned with two components of the splitter epicyclic. The recirculating epicyclic provides an additional output which is connectable to the output shaft to provide at least one creep regime. The clutch can either be locked when starting with the creep regime operative or slippingly engaged when starting with the creep regime non-operative.

5 Claims, 5 Drawing Sheets

CONTINUOUSLY VARIABLE TRANSMISSION

The invention relates to transmissions and in particular to continuously-variable-transmissions (CVT's) of the kind which include a differential with two outputs and a ratio-varying unit or variator connecting the two outputs together. The differential is driven by an engine and for a constant engine speed, as the variator is cycled through its ratio range, one output speed increases whilst the other output speed simultaneously decreases. A final output shaft is driven from either of the outputs via selectable gear pairs. The selectable gear pair ratios are chosen such that, at the extreme of the variator ratio cycle, the output speed from one gear pair from one differential output shaft is the same as the output speed from the next gear pair from the other differential output shaft. Thus the drive to the final output shaft may be shifted from one differential output shaft to the other without breaking the drive.

It is the object of the present invention to provide an improved CVT, in particular one suitable for use in agricultural tractors.

Thus according to the present invention there is provided a continuously-variable-transmission (CVT) operable in a plurality of regimes comprising a ratio-varying unit ("variator"), an epicyclic unit, a plurality of ratio combinations, a plurality of regime engaging couplers, a clutch and a drive output shaft, the epicyclic unit including a splitting epicyclic gear and the CVT being arranged such that:

(i) two components of the splitter epicyclic gear are connected to opposite ends of the variator;

(ii) the epicyclic unit has a plurality of outputs connectable in a plurality of different ways to the drive output shaft by way of the plurality of ratio combinations and the plurality of regime engaging couplers in order to provide the plurality of regimes, and (iii) the clutch is engageable on starting from rest to provide speeds from zero upwards.

The CVT provides the advantage that when starting from rest, particularly under light load, the clutch may be engaged gradually to provide the speed range of the lowest ratio regime(s) whilst a higher ratio regime is operative. This avoids rapid changing of of low ratio regimes when high acceleration is achieved under light load conditions.

The epicyclic unit may also include a recirculating epicyclic gear with the CVT being further arranged such that:

(i) the said two components of the splitter epicyclic gear are commoned with two components of the recirculating epicyclic gear;

(ii) the epicyclic unit and variator ratios are chosen so that at a predetermined variator ratio the epicyclic unit rotates as one whereby alternate regime changes occur at the predetermined variator ratio;

(iii) the recirculating epicyclic gear provides an additional output from the epicyclic unit which is connectable to the output shaft to provide one or more creep regimes with speed ranges including zero, and (iv) the clutch may be (a) locked when starting from rest with one of the creep regimes operative or (b) gradually engaged when starting from rest with a non-creep regime operative in order to by-pass the creep regime(s).

This embodiment provides the advantage that a clutch is provided which may be used to start from rest by-passing one or more of the lowest speed regimes or the clutch may be locked and the transmission used as a full CVT. Alternatively the clutch may be provided in place of one or more of the lowest speed regimes thus making the construction of the transmission simpler and cheaper.

The CVT may also comprise a power-take-off (PTO) output shaft the drive from the input shaft to which by-passes the variator, the epicyclic unit, the ratio combinations and the couplers. The inclusion of a PTO output shaft is important if a CVT is to be suitable for use in an agricultural tractor.

The variator may be of any suitable form, for instance toroidal-race rolling-traction type, belt-and-sheave or hydrostatic. The variator may be enclosed in a variator casing within a main transmission casing in order that the oil in which the variator operates is kept separate from that in which the remaining portions of the CVT operate.

Embodiments of the invention will now be described, by way of example only, with reference to the drawings in which.

Figure 1:
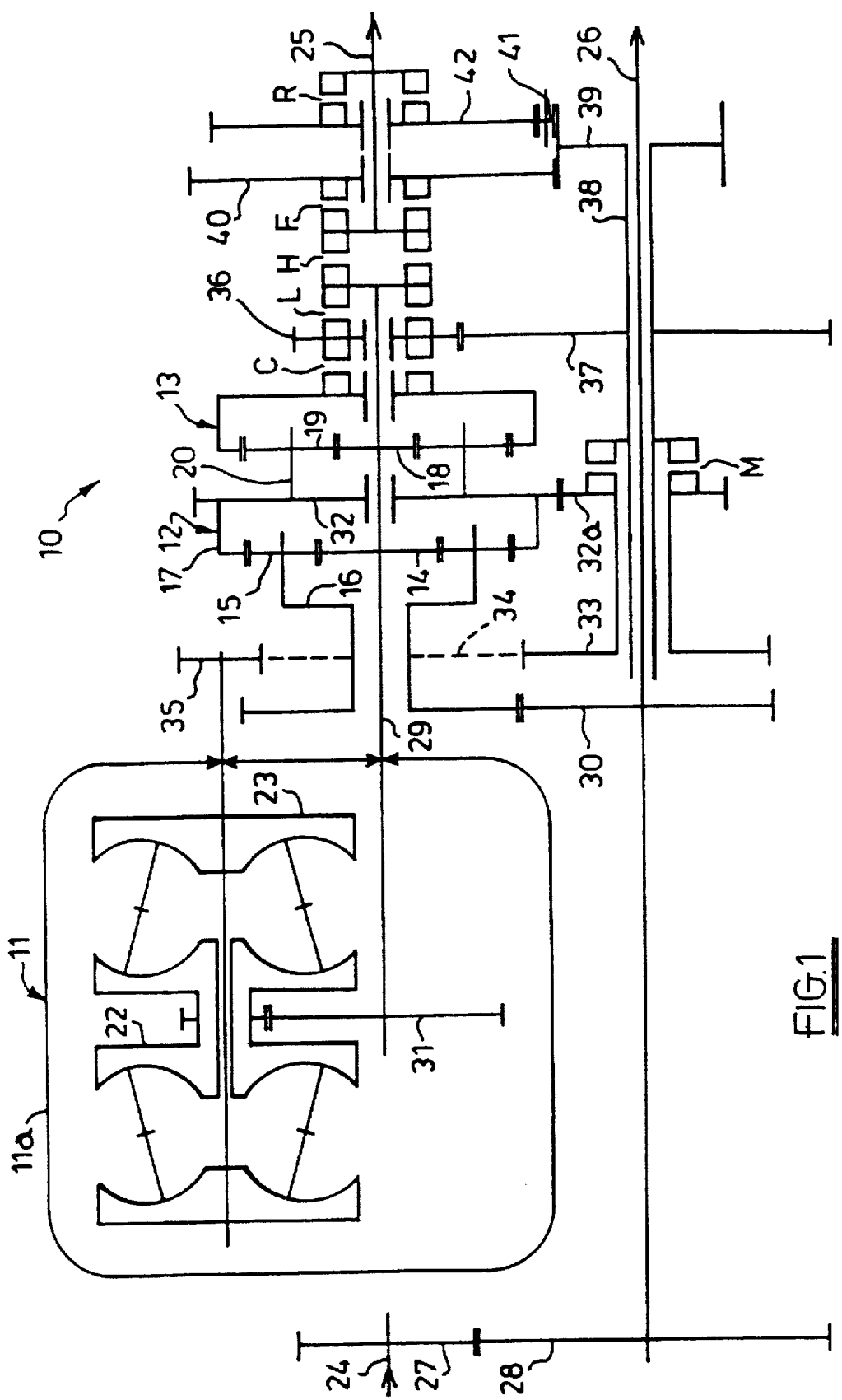
FIG. 1 is a schemmatic view of a novel form of CVT.

FIG. 1 shows a CVT 10 which includes a variator 11, of the well known toroidal-race rolling-traction type, which provides a ratio of 0.447–2.235:1 and splitter and creep, or recirculating, epicyclic gears 12 and 13 which provide ratios of 2.235:1 and 4.0:1 respectively. The splitter epicyclic gear 12 comprises sun 14, planets 15, planet carrier 16 and annulus 17. Likewise, the creep epicyclic gear 13 comprises sun 18, planets 19, planet carrier 20 and annulus 21. The annulus 17 of splitter epicyclic 12 and the planet carrier 20 of creep epicyclic 13 are a single part which also incorporates gear 32 which meshes with gear 32a. The variator 11 comprises first and second operating members 22 and 23 which cannot be described as inputs or outputs as their functions alternate during the use of the CVT as will be described later.

The CVT 10 has an input shaft 24 from an engine and drive and power-take-off (PTO) output shafts 25 and 26. The input shaft 24 drives the PTO shaft 26 via gears 27 and 28 which provide a ratio of 2.0:1. The PTO shaft 26 drives planet carrier 16 of epicyclic gear 12 via gear 30. The ratio of gear 30 may be chosen to match the maximum output speed of the CVT with the rest of the tractor, in a typical example, this ratio is 1.1:1. Planet carrier 16 of epicyclic 12 drives sun 14 and annulus 17 of epicyclic 12. Sun 14 of epicyclic 12 drives operating member 22 of variator 11 via shaft 29 and gear 31, and annulus 17 of epicyclic 12 drives operating member 23 of variator 11 via gear pair 32 and 32a and gear pair 33 and 35. It should be noted that gears 33 and 35 actually mesh but due to the schematic view of FIG. 1 this is represented by dashed line 34. Thus sun 14 and annulus 17 of epicyclic gear 12 have a combined speed which is driven by planet carrier 16 (and therefore by input shaft 24), but a relative speed which is controlled by variator 11. Sun 14 of epicyclic gear 12 drives sun 18 of epicyclic gear 13, and annulus 17 of epicyclic gear 12 drives planet carrier 20 of epicyclic gear 13. Annulus 21 of epicyclic gear 13 is thus driven by both sun 14 and annulus 17 of epicyclic gear 12. The ratio of epicyclic gear 13 is chosen such that the speed of annulus 21 is zero at one extreme ratio of variator 11.

The CVT 10 provides seven regimes: reverse medium (RM), reverse low (RL), reverse creep (RC), forward creep (FC), forward low (FL), forward medium (FM) and forward high (FH). Selectable gear pairs are incorporated to provide these regimes. Gears 36 and 37 provide a ratio of 2.235:1 for the creep and low regimes, gear 37 being mounted for rotation with tubular counter shaft 38 which is concentric with the PTO shaft 26. Gear 39 is mounted for rotation with counter shaft 38 and drives the forward direction gear 40 (providing a ratio of 2.235:1) and the reverse direction gears 41 and 42 (providing a ratio of 2.0:1), gear 41 being an idler. Six couplers referenced C, L, M, H, F, and R are provided in order to select the required operating regime.

Creep coupler C, when engaged, connects the annulus 21 of the creep epicyclic gear 13 to low regime gear 36 and thus provides drive via gear 37, tubular shaft 38, gear 39 and either forward gear 40 or reverse gears 41 and 42 depending on whether coupler F or coupler R is engaged. Low coupler L, when engaged, connects centre shaft 29 to low regime gear 36 and thus provides drive via the same route as for the creep regime. Medium coupler M, when engaged, connects gear 33 to the tubular shaft 38 thus providing drive via gear 39 and either gear 40 or gears 40 and 41. High coupler H, when engaged, connects the centre shaft 29 directly to the drive output shaft 25 thus providing drive without the engagement of either the forward or reverse coupler F or R.

The operation of the CVT 10 will now be described. Power from the engine is supplied to the planet carrier 16 of the splitter epicyclic 12 and is split by the splitter epicyclic 12 between the sun 14 and the annulus 17. A proportion of the power is fed directly to the output via the sun 14 whilst the remainder is fed to the output via the annulus 17 and the variator 11. As the ratio of the variator 11 is varied the relative speeds of the operating members 22 and 23 alter.

Figure 2:
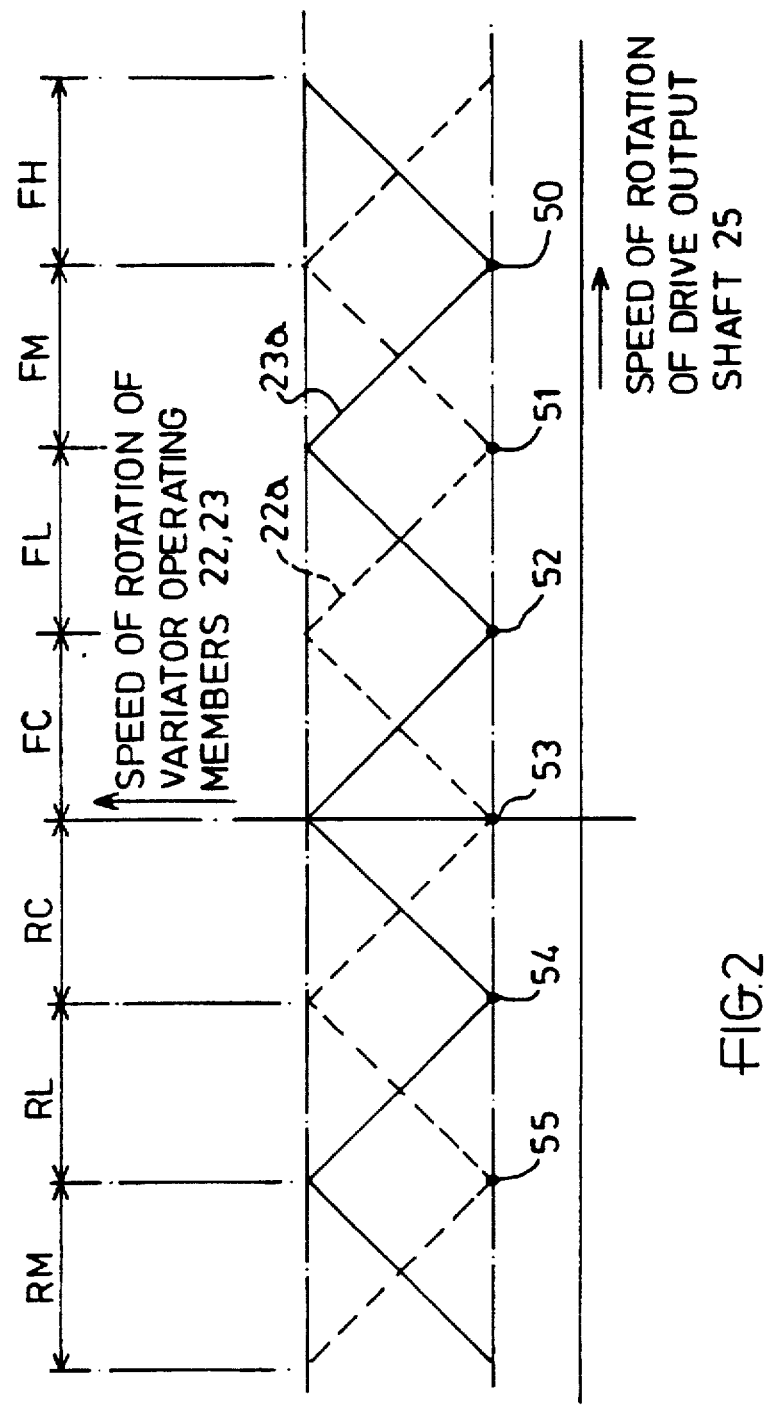
FIG. 2 is a graphical representation of the speeds of the two sides of the variator versus the speed of the drive output shaft.

Referring now to FIG. 2, the speeds of rotation of the variator operating members 22 and 23 are illustrated by solid line 22a and broken line 23a respectively. The drive output shaft speeds over which each of the seven regimes is operative are indicated above the graph. At the maximum output shaft speed, in regime FH, the speed of rotation of operating member 22 is at its maximum and that of operating member 23 at its minimum. As the variator is cycled through its ratio range the speed of rotation of operating member 22 decreases and that of operating member 23 increases and the speed of the drive output shaft decreases.

At point 50 the speed of rotation of operating member 22 has reached its minimum and that of operating member 23 has reached its maximum. At this point coupler M is engaged, this being possible because the whole of the two epicyclic gears 12 and 13 is rotating as one and the drive to the drive output shaft 25 through coupler M is at the same speed as that through coupler H. Thus the transition from regime FH to regime FM is made, as coupler M is engaged and coupler H subsequently disengaged, without there being any jerk or break in the drive to the drive output shaft 25.

The variator 11 is then cycled through its ratio range again and the speeds of rotation of operating members 22 and 23 again reverse, until at point 51 operating member 22 is again rotating at maximum speed and operating member 23 at minimum speed. The transition from regime FM to regime FL is made at this point by engagement of coupler L and subsequently disengagement of coupler M. This is again possible because at point 51 the drive to drive output shaft 25 via couplers L and M is at the same speed.

Similarly the variator 11 is cycled through its ratio range to point 52 for the transition between regimes FL and FC by engagement of coupler C and subsequent disengagement of coupler L. In the creep regimes FC and RC some of the power is recycled by the creep epicyclic gear 13. When the fourth cycle of the variator is completed, and point 53 is reached, annulus 21 of the creep epicyclic has zero speed and all the power is recycled with none being fed to the drive output shaft 25. This is a condition known in the art as geared neutral. At this point coupler R is engaged and coupler F subsequently disengaged thus making the transition from regime FC to regime RC.

In the same manner the fifth cycle of the variator 11 reaches point 54 and the transition between regimes RC and RL, the sixth cycle to the final transition point 55 between regimes RL and RM, and seventh cycle to the maximum reverse speed of the drive output shaft 25.

For a constant engine input speed of 2200 rev/min on the input shaft 24 the CVT 10 can supply drive output shaft speeds in the range −1118 to +2269 rev/min including zero. In the four forward regimes the following vehicle speeds are provided: FC—zero to 2.5 km/h, FL—2.5 to 6.4 km/h, FM—6.4 to 16 km/h and FH—16 to 40 km/h.

Figure 3:
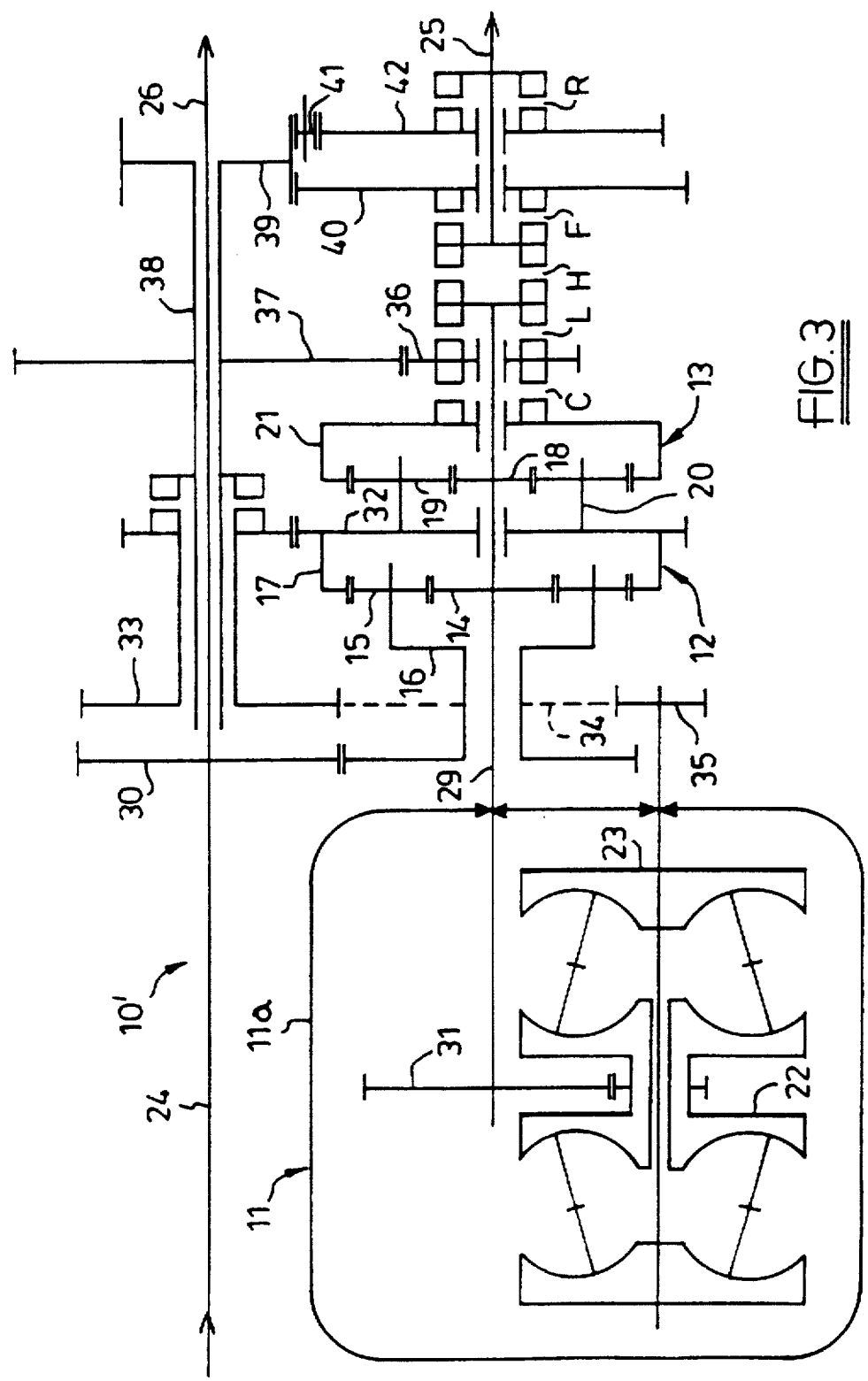
FIG. 3 is a schemmatic view of an alternative embodiment of the novel CVT of FIG. 1.

Referring now to FIG. 3, an alternative embodiment 10' of a CVT will now be described with parts common to the CVT 10 of FIG. 1 like referenced. Some agricultural tractors are designed with the PTO output shaft below the drive output shaft (bottom shaft PTO) as described above and as shown in FIG. 1 and some with the PTO output shaft above the drive output shaft (top shaft PTO). The CVT 10' of FIG. 3 is of the latter type and is in fact essentially the FIG. 1 CVT as described above but turned upside down, consequently there is very little difference between the two CVTs 10 and 10' and for brevity only the differences will be described.

The main difference between the FIG. 1 and 3 CVT's 10 and 10' is that in CVT 10' the input shaft 24 is one and the same with the PTO output shaft 26 and the gears 27 and 28 are omitted. In addition, although the centre shaft 29 is again coaxial with the drive output shaft 25 it is no longer coaxial with the input shaft 24 as well. All other parts are identical in both CVTs 10 and 10'. Clearly this provides a distinct advantage, particularly to any manufacturer which produces tractor transmissions with both top shaft and bottom shaft PTOs.

Figure 4:
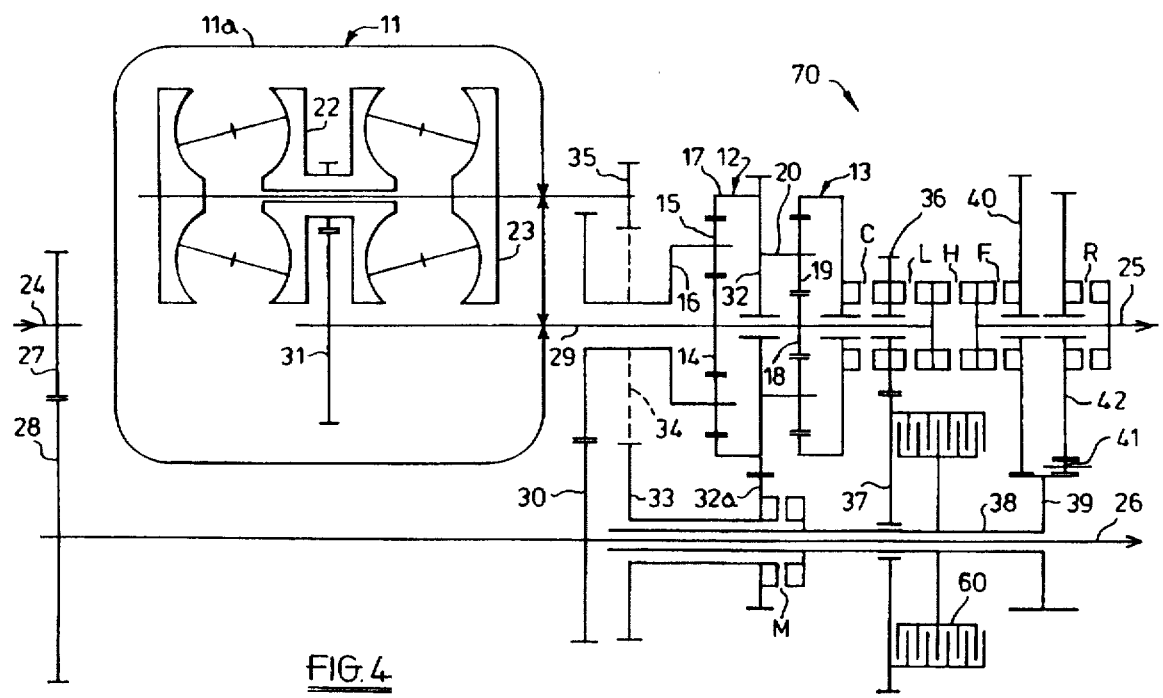
FIG. 4 is a schemmatic view of a CVT according to the present invention.

The CVTs 10 and 10' of FIGS. 1 and 3 do suffer from one significant disadvantage, when starting from rest with only a light load the acceleration will be such that regime changes will be required to occur very rapidly. FIG. 4 shows an embodiment 70 a CVT according to the invention designed to overcome this disadvantage. Parts common to FIG. 1 are like referenced.

The essential difference between the CVTs 10 and 70 of FIGS. 1 and 4 is a clutch 60 by means of which gear 37 may be connected for rotation with shaft 38 rather than being permanently connected for rotation with shaft 38. The clutch 60 may be gradually engaged, i.e. allowing slippage, to start from rest in FL or RL regimes. The slippage of the clutch 60 covers the speed range of the FC or RC regimes allowing the by-passing of these regimes completely. To obtain the creep regimes FC and RC the clutch 60 is locked and the CVT 70 of FIG. 4 functions exactly as the CVT 10 of FIG. 1.

Figure 5:
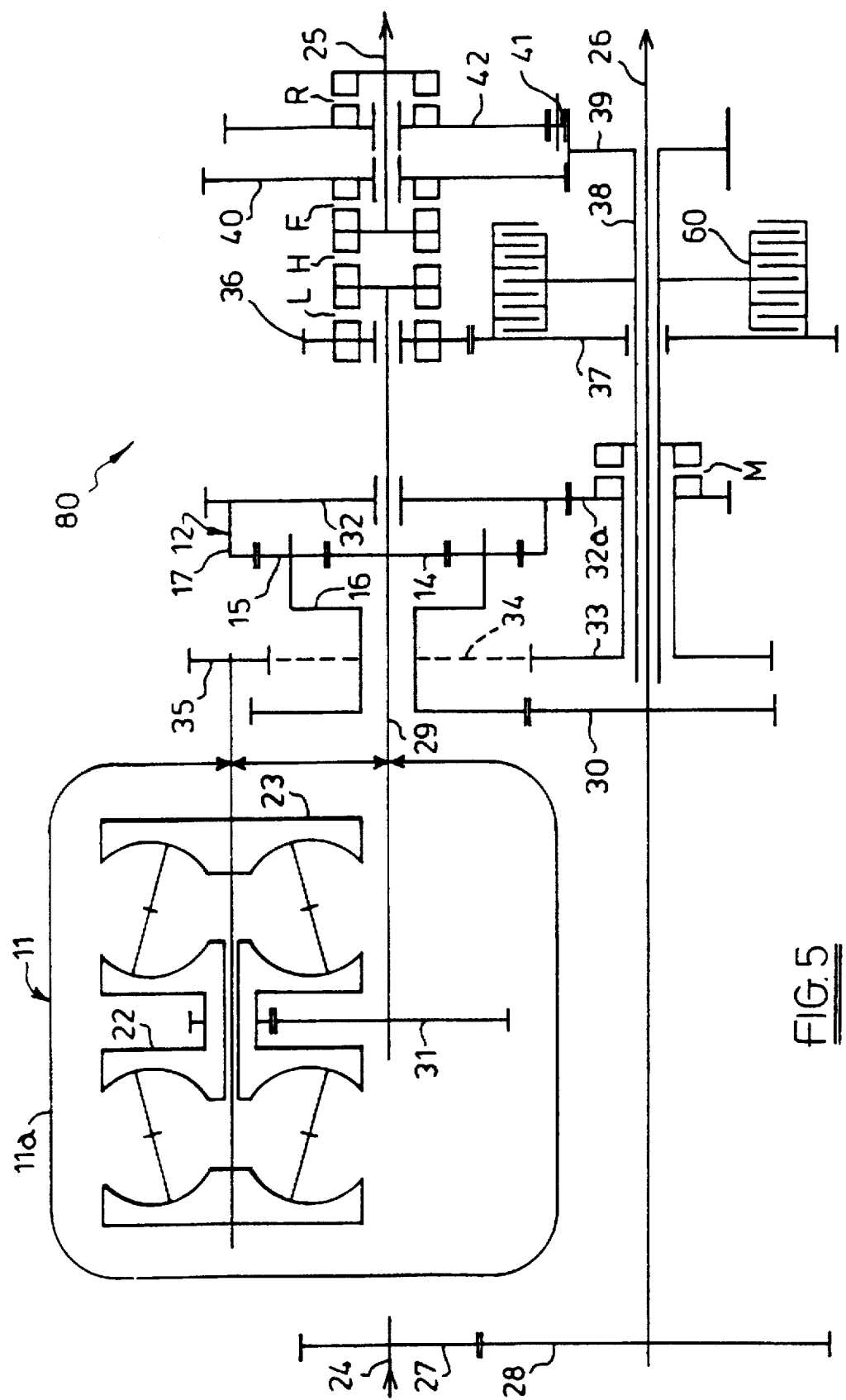
FIG. 5 is a schemmatic view of an alternative embodiment of a CVT according to the present invention.

In some circumstances the creep regimes may not be needed as high loads are not to be exerted at low ground speeds or low ground speeds are not to be required for prolonged periods of time. FIG. 5 shows an embodiment 80 of a CVT according to the invention which is particularly suitable for such vehicles, which will now be described. Parts common with the CVTs of FIGS. 1, 3 and 4 are like referenced.

The essential difference between the CVTs 70 and 80 of FIGS. 4 and 5 is that in CVT 80 the creep, or recirculating, epicyclic gear is omitted as is the creep coupler. Thus the only means by which the speeds covered by FC and RC regimes can be obtained is by use of the clutch 60. Clearly this embodiment provides the advantages of reduced complexity and thus of reduced cost.

The CVTs 70 and 80 of FIGS. 4 and 5 have the added advantage that, since no drive goes via gear 37 for medium and high regimes, the clutch 60 may be disengaged for the FM, FH and RM regimes thus preventing gear 36 rotating at high speeds unnecessarily and wasting power.

The CVTs described above are able to operate in seven different regimes. However, CVTs according to the invention are in no way limited to being operable in seven regimes as the number of gear pairs and couplers provided for the engagement of regimes can be either reduced or increased at will. In addition the ratios quoted throughout the above description are only given by way of example, and clearly may be altered by those skilled in the art as appropriate for any application. Further, it is not necessary for the regimes to be arranged such that a regime change occurs at zero speed, zero may be provided part way through the speed range of a single regime.

Embodiments of CVT according to the present invention could be constructed in which a clutch is provided to by-pass, or to replace, several of the lowest speed regimes and not just the very lowest speed regimes. This is most likely to be applicable in embodiments with more regimes than incorporated in the above described embodiments.

The CVTs described above all incorporate a variator of the toroidal-race rolling-traction type, however, the invention is by no means limited to the inclusion of such variators. Most known forms of variator are suitable for inclusion in CVTs according to the invention but those which are not capable of providing a zero output speed are most applicable, for instance belt-and-sheave variators.

It should be noted from all of FIGS. 1, 3, 4 and 5 that, in each case, the variator 11 is enclosed in a variator casing 11a within the main gearbox casing (not shown). This enables only the variator 11 to operate in the special oil, or traction fluid, in which it performs best and allows the remaining portions of the transmission to operate in normal gearbox oil. This is preferable to the whole transmission operating in the traction fluid as it is considerably more expensive than normal gearbox oil and agricultural tractors have very large quantities of oil in their transmissions, often several gallons.

The couplers C, L, M, H, F and R incorporated in the CVTs 10, 10', 70 and 80 may be of any form which is capable of being disengaged under load. At each regime transition two couplers are engaged at once for a short time. In each case the two couplers drive the drive output shaft 25 at the same speed as each other. However, in such situations it is not possible to determine which of the two couplers will actually be transmitting torque at any particular time. Therefore it may be that when a coupler is disengaged to complete the transition from one regime to the next it may be transmitting torque at that time. Hence the requirement that the couplers should be capable of being disengaged whilst under load.

The CVTs described above are particularly suitable for agricultural tractors for the following reasons. Firstly, for an agricultural tractor it is desirable to have a working vehicle speed range of approximately 4 to 40 km/h over which the full engine power is transmitted through the CVT and delivered to the ground wheels. In the creep regimes, some of the power is re-circulated within the CVT, so that the variator 11 is handling more power than the input or output power. Since the size and cost of the variator 11 is determined by the maximum power which passes through it, it is necessary to limit the power which is transmitted by the CVT in the creep regimes. At speeds below about 4 km/h, it becomes practically impossible to transmit the full engine power through the tractor's wheels because they slip. Therefore, provided the the maximum speed in the creep regimes is less than 4 km/h, the power limitation does not affect the function of the tractor. It remains necessary to be able to achieve speeds between zero and 4 km/h in order that the tractor may operate with PTO driven machines; in such circumstances, a high proportion of the engine's power is transmitted through the PTO, leaving very little to pass through the CVT.

Secondly, any transmission for an agricultural tractor must incorporate a full engine power PTO shaft which the CVTs described above clearly provide.

The CVTs described above also provide the general advantage that the two connections to the variator 11 are both via a pair of speed increasing gears, 16, 30 or 33, 35. This makes it a simple matter to adjust the variator operating speed as it can be done by changing just those gear pairs and no further gears. It is a feature of rolling-traction variators that it can be run at high speeds without loss of efficiency, and since it's size is determined by the maximum torque, it can be made smaller if it runs fast. The gear pairs 16, 30, and 33, 35 have the same ratio, and this ratio may be chosen to provide the best variator speed without any affect on the rest of the CVT. In FIGS. 1 and 3, a ratio of 3:1 is shown, which gives a maximum variator speed of 6600 rev/min. Some other CVT proposals have the variator running at engine speed and thus require a much larger and more costly variator.

Thirdly, both members of the variator are driven by gears, so that the variator assembly can be removed for service without dismantling the rest of the CVT. This is a great advantage in an agricultural tractor, since the transmission case generally forms part of the tractor chassis structure, and dismantling the transmission requires special facilities and much time.

What is claimed is:

1. A continuously-variable transmission (CVT) operable in a plurality of regimes comprising a ratio-varying unit ("variator"), an epicyclic unit, a plurality of ratio combinations, a plurality of regime engaging couplers, a clutch, and a drive output shaft, the epicyclic unit including a splitting epicyclic gear and a recirculating epicyclic gear, the CVT being arranged such that:

(i) two components of the splitting epicyclic gear are connected to opposite ends of the variator and are commoned with two components of the recirculating epicyclic gear;

(ii) the epicyclic unit has a plurality of outputs connectable in a plurality of different ways to the drive output shaft by way of the plurality of ratio combinations and the plurality of regime engaging couplers in order to provide the plurality of regimes;

(iii) the epicyclic unit and variator ratios are chosen so that at a predetermined variator ratio, the epicyclic unit rotates as one, whereby alternate regime changes occur at the predetermined variator ratio;

(iv) the recirculating epicyclic gear provides an additional output from the epicyclic unit which is connectable to the output shaft to provide at least one creep regime with speed ranges including zero; and (v) the clutch can be either (a) locked when starting from rest with one of the creep regimes operative or (b) be slippingly engaged when starting from rest with a non-creep regime operative in order to by-pass the creep regime(s).

2. A CVT according to claim 1 in which none of the regimes have speed ranges including zero, and the clutch is slippingly engagable when starting from rest to provide speeds from zero to the lowest speed of the lowest ratio combination.

3. A CVT according to claim 1 which also comprises a power-take-off (PTO) output shaft, the drive to which by-passes the variator, epicyclic unit, ratio combinations, and couplers.

4. A CVT according to claim 1 in which the variator is of the toroidal-race rolling-traction type.

5. A CVT according to claim 4 in which the variator is contained within a variator casing within a main transmission casing such that the oil in which the variator operates is kept separate from the oil in which all other parts of the CVT operate.

* * * * *